United States Patent
Zanovello et al.

(10) Patent No.: US 8,376,658 B2
(45) Date of Patent: Feb. 19, 2013

(54) HARBOR

(75) Inventors: Roberto Zanovello, Genoa (IT); Giovanni Perfumo, Genoa (IT); Paolo Rossi, Reggio Emilia (IT)

(73) Assignees: P & T S.R.L. Port and Territory (IT); Reggiane Cranes and Plants S.p.A. (IT); Sintagma Sviluppo Progetti S.R.L. (IT)

( * ) Notice: Subject to any disclaimer, the term of this patent is extended or adjusted under 35 U.S.C. 154(b) by 523 days.

(21) Appl. No.: 11/658,252

(22) PCT Filed: Jul. 28, 2005

(86) PCT No.: PCT/IB2005/002238
§ 371 (c)(1),
(2), (4) Date: Sep. 16, 2008

(87) PCT Pub. No.: WO2006/035271
PCT Pub. Date: Apr. 6, 2006

(65) Prior Publication Data
US 2009/0052993 A1    Feb. 26, 2009

(30) Foreign Application Priority Data
Jul. 30, 2004  (IT) .............................. GE2004A0073

(51) Int. Cl.
*E02B 3/06* (2006.01)
*E02D 23/02* (2006.01)
*E02D 27/18* (2006.01)
*B65G 63/00* (2006.01)

(52) U.S. Cl. ...................................... 405/218; 405/205

(58) Field of Classification Search ................ 405/8, 14, 405/203–205; 114/258
See application file for complete search history.

(56) References Cited

U.S. PATENT DOCUMENTS

| | | | | |
|---|---|---|---|---|
| 2,044,795 A * | 6/1936 | Knight | .......................... | 405/203 |
| 2,705,403 A * | 4/1955 | Ebert | .............................. | 405/13 |
| 3,287,921 A * | 11/1966 | Wilson et al. | ..................... | 405/3 |
| 4,023,687 A * | 5/1977 | Salloum | ........................ | 414/276 |
| 4,701,075 A * | 10/1987 | Martyshenko et al. | ....... | 405/217 |
| 4,799,828 A * | 1/1989 | Georgii | ..................... | 405/195.1 |
| 4,993,347 A * | 2/1991 | Filho | ............................. | 405/218 |
| 5,951,226 A * | 9/1999 | Fantuzzi | .................... | 414/141.3 |
| 6,017,167 A | 1/2000 | Chattey | | |
| 6,234,714 B1 * | 5/2001 | Chattey | ............................. | 405/8 |
| 6,802,684 B2 * | 10/2004 | Arntzen et al. | ............. | 414/140.3 |
| 2004/0007552 A1 | 1/2004 | Franzen et al. | | |

FOREIGN PATENT DOCUMENTS

| | | |
|---|---|---|
| DE | 34 21 418 | 1/1986 |
| EP | 0 008 567 | 3/1980 |
| WO | WO 01/42571 | 6/2001 |

* cited by examiner

*Primary Examiner* — Tara Mayo-Pinnock
(74) *Attorney, Agent, or Firm* — Cantor Colburn LLP

(57) ABSTRACT

An improved harbor, which comprises at least one lower level and at least one upper level for loading and unloading goods in a harbor area, the levels being arranged one above the other and so that at least the lower level lies below sea level.

9 Claims, 3 Drawing Sheets

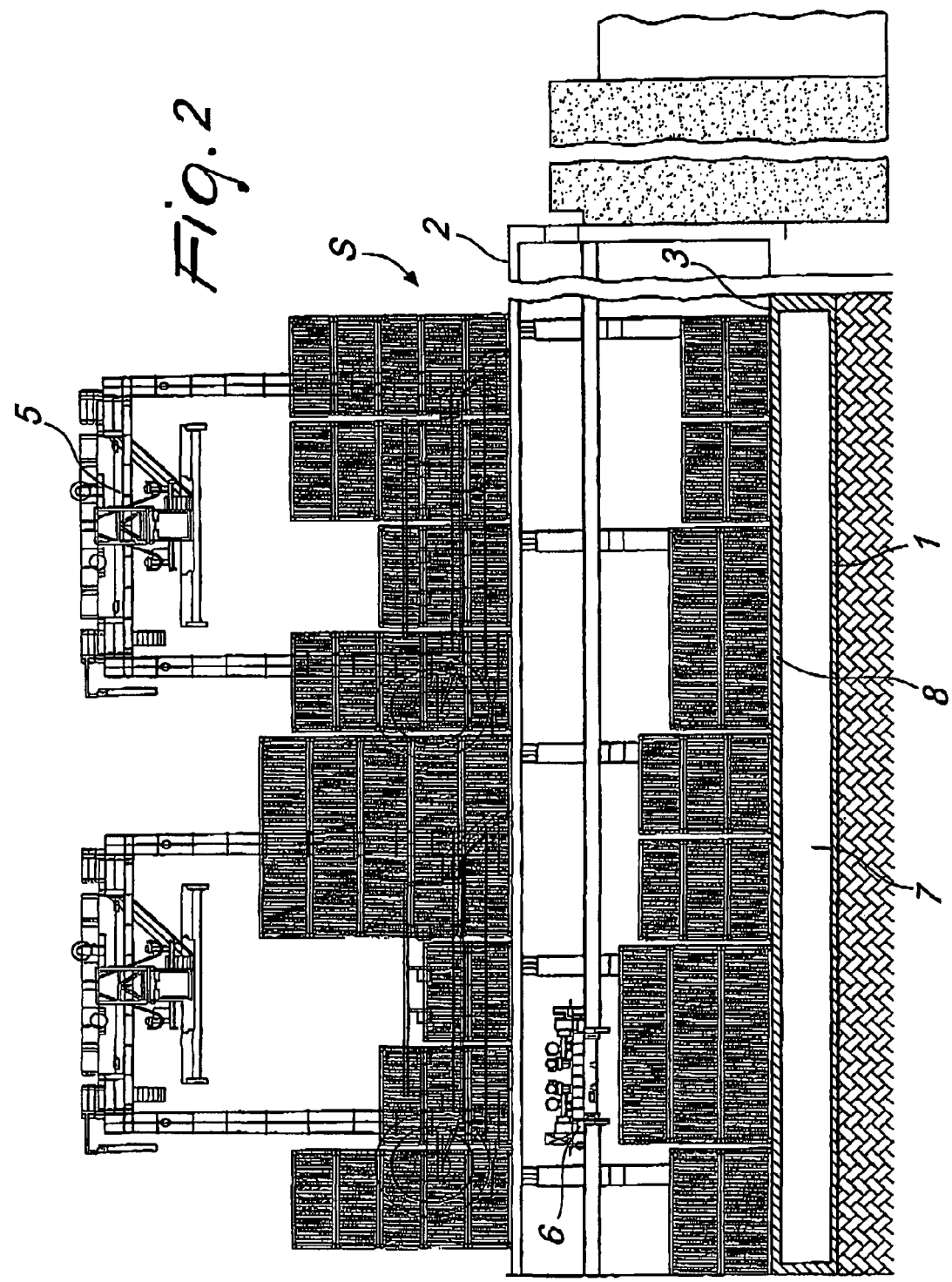

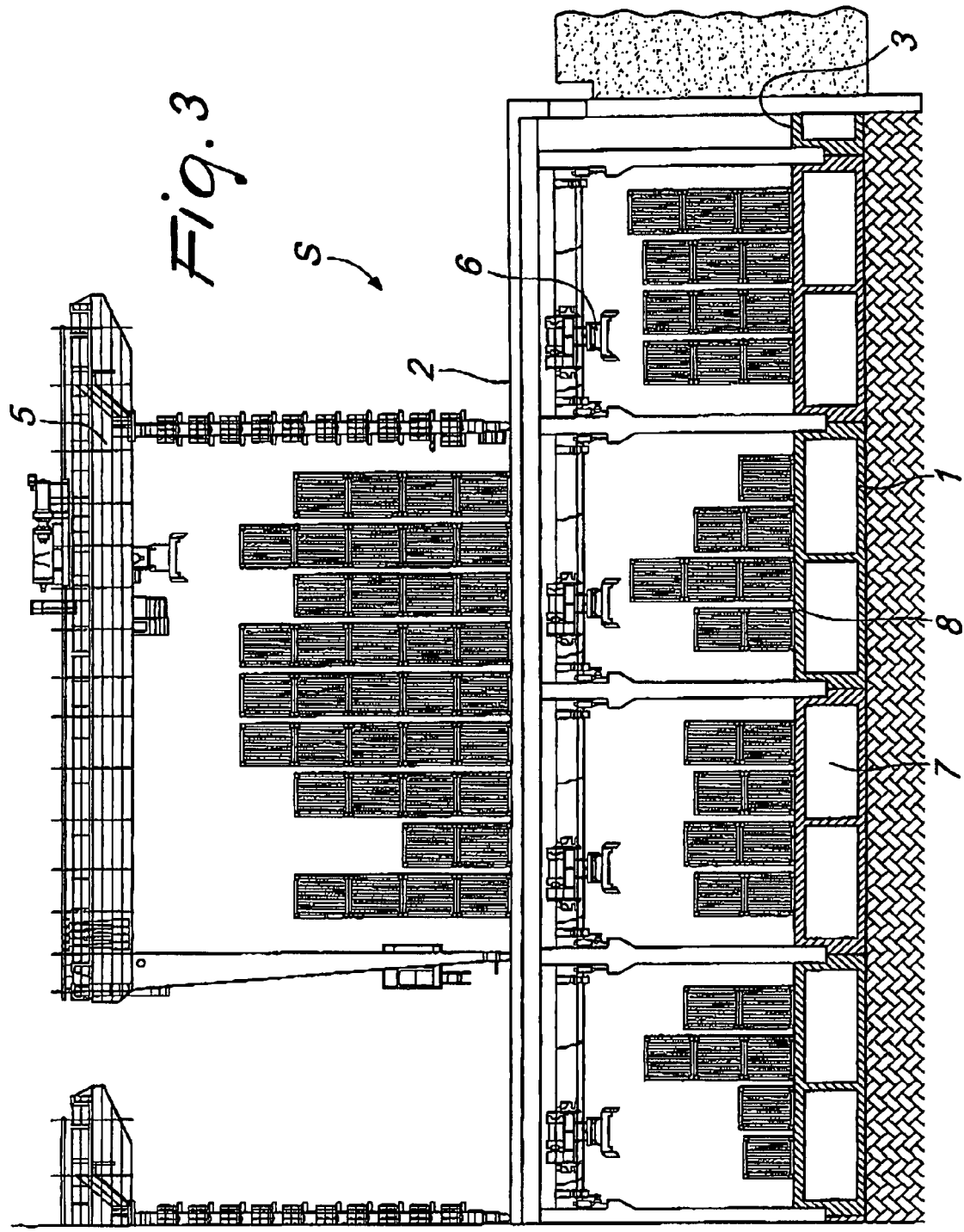

HARBOR

TECHNICAL FIELD

The present invention relates to an improved harbor.

BACKGROUND ART

The technique currently used in order to cope with the increasing demand for areas in harbors is to provide docks by obtaining from the sea the surfaces required for handling goods in harbors.

This technique consists in filling the seabed with rocks or other material up to sea level or in building a supporting structure of the so-called type with "submerged caissons", to be filled with inert material or the like, and in then forming an upper quay for handling goods.

This technique is not free from drawbacks, including the fact that it fills seabeds that lie increasingly further from the coast and are in practice increasingly deeper, with the consequence that the times and costs for building the structures rise considerably and the marine environment is increasingly compromised, triggering the protests of the populations that reside along the coast and leading to more critical environmental impact assessments.

DISCLOSURE OF THE INVENTION

The aim of the present invention is to eliminate the cited drawbacks, by providing an improved harbor that allows to reduce considerably the surfaces of the bodies of water to be covered in order to cope with the demand for areas to be assigned to harbor operations, with a consequent reduced impact on the environment and reach and shorter construction times.

This aim and other objects that will become better apparent hereinafter are achieved by the present improved harbor, characterized in that it comprises at least one lower level and at least one upper level for loading and unloading goods in a harbor area, said levels being arranged one above the other and at least said lower level lying below sea level.

BRIEF DESCRIPTION OF THE DRAWINGS

Further characteristics and advantages of the present invention will become better apparent from the following detailed description that follows of a preferred but not exclusive embodiment of an improved harbor, illustrated by way of non-limiting example in the accompanying drawings, wherein;

FIG. 2 is a sectional view, taken along the line II-II of FIG. 1;

FIG. 3 is a sectional view, taken along the line III-III of FIG. 1.

WAYS OF CARRYING OUT THE INVENTION

Figure 1:
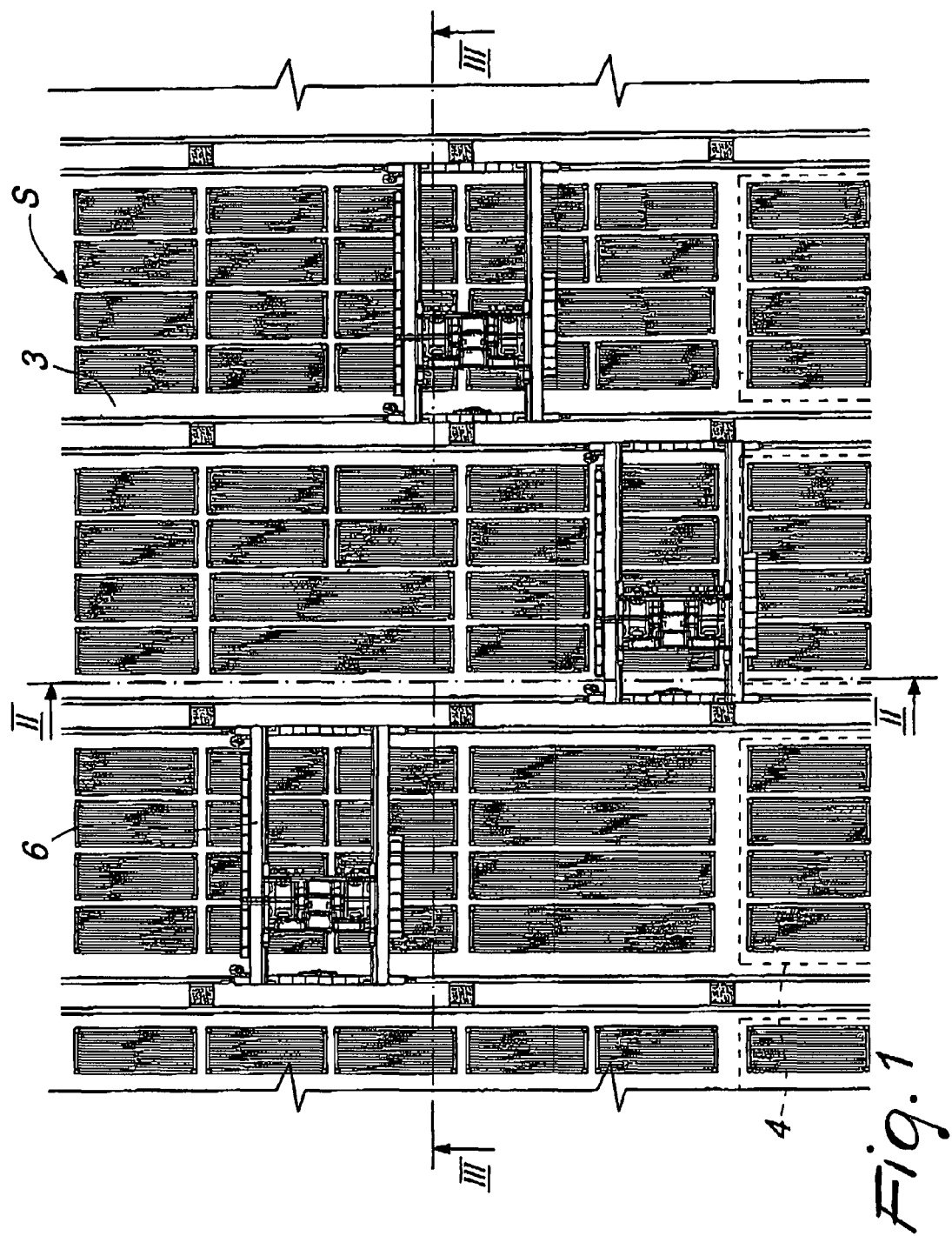
FIG. 1 is a plan view of the lower level of the harbor according to the invention.

With reference to the figures, the reference sign S generally designates an improved harbor.

The harbor S comprises a lower level 3 and an upper level 2 for loading and unloading goods in a harbor area, said levels being arranged one above the other, with at least the lower level below sea level. The upper level is arranged substantially proximate to sea level or above it.

The lower level 3 is therefore arranged below sea level and has an extension that is equal to the extension obtained on the surface by the upper level 2.

By means of this new technique, with respect to the same available footprint, the areas that can be reserved to harbor operations and services are doubled, thus reducing by approximately 50% the amount of land taken from the sea. This allows to proceed with the planned expansion of harbors with a development criterion that is environmentally less disruptive and more focused on safeguarding the marine environment.

The areas thus obtained on the lower level 3 can, in a functional integration with the upper level 2, be used as container terminals, multipurpose terminals, conventional-goods and miscellaneous-goods terminals, Ro-Ro terminals, ferry terminals, terminals of "sea motorways", storage areas of any kind and depots of mineral oils and chemical products or other products and/or for any other function links to harbor logistics.

The embodiment of the invention shown in the figures illustrates the functional destination as a container terminal, which explains fully the potential of the invention. This type of use is a demonstration and explanation also for the other typos of terminal.

The solution designed for the container terminal has an integrated system of automation and technological components, needed to ensure the functional coordination of the two levels 2 and 3, and in particular to ensure the efficiency of handling on the lower level 3.

The accompanying drawings illustrate the integrated use of the lower level 3 and the upper level 2 in a container terminal, wherein the lower level 3 is obtained starting from the seabed while the upper level 2 is obtained by covering the lower level 3.

The structural and technological solutions of the lower level 3 allow to store and handle containers that are stacked at least three high (the fourth height is reserved as a corridor for the transfer of the containers); however, alternative embodiments of the harbor S are not excluded in which the height of the lower level 3 allows to deposit a different number of stacked containers.

A plurality of bridge cranes of a special low-height type 6 are provided specifically in order to meet the function of container handling and are such as to match the size constraints within the structure of the lower level 3; as alternative to said bridge cranes, or in combination with them, it is also possible to provide other systems suitable for handling the containers, both of the manual type (even remotely, by virtue of TV camera systems etc) and of the automatic and semiautomatic type, allowing swift handling and maximum utilization of the storage height.

The containers are handled between the levels 2 and 3 by utilizing transfer systems 5 such as bridge cranes or gantry cranes, which operate within the container park of the upper level 2 and provide both horizontal handling of the containers on the upper level 2 and the handling for transferring the containers between the levels 2 and 3, through one or more slots or openings 4, which are conveniently located in the floor slab of the upper level 2.

In the particular embodiment of the invention shown in the figures, the upper level 2 is arranged substantially proximate to sea level.

However, the distance between the two levels 2 and 3 can be increased in order to allow higher storage capacity on the lower level 3. In this case, the floor slab of the upper level 2 is provided at a substantially raised level with respect to sea level: this possible increase in height of the upper level 2 also allows to improve the performance of operations for unloading and loading containers, since it is possible to reduce the cycle times of these operations. If the upper level 2 is raised with respect to embodiment shown in the figures, the storage capacity within the lower level 3 is greater than three stacked containers.

The operations on the lower level 3 occur in safe conditions, without human presence (which is required only for inspection and maintenance operations while the systems are stopped).

The reliability of the deposition and pick-up operations is ensured by systems for trackability of the carriers and for traceability of the goods implemented by means of fully automated data-communications and computer technologies.

The structural part of this innovative system provides for closing, by means of masonry work, the body of water onto which the harbor S is to be provided, draining the body of water inside the masonry work, building a level 1 for laying the lower level 3, provided by means of underpinning systems formed by caissons to be filled with inert materials 7 or another system defined on the basis of the existing characteristics.

A deck 8 is provided on the laying level 1 and comprises waterproofing and active drainage structures, from which pillars and supporting structures for the upper level 2 protrude and are rigidly connected to the underpinning system.

The center distance between the pillars is sized so as to contain multiples of containers to be accommodated and spaces for maintenance inspections, optimizing the operational use of the total available space and also in order to support the lanes of the park lifters and/or of any other handling means operating on the lower level 3.

The application of the invention to the execution of container terminals can be extended also to the case of multipurpose terminals, conventional-goods terminals, miscellaneous-goods terminals, Ro-Ro terminals, ferry terminals, "sea motorways", magazines and depots of mineral oils/chemical products or other loose, packaged or liquid products.

In these cases, the stacked levels 2 and 3 are mutually connected by virtue of openings arranged appropriately in the floor slab of the upper level 2 and, if necessary, also by means of access ramps.

Alternative embodiments of the invention are furthermore possible in which, depending on the depth of the sea, one or more intermediate goods loading and unloading levels are provided which are interposed between the lower level 3 and the upper level 2 and are functionally equipped in a manner similar to the lower level 3 in order to allow handling of goods both on said intermediate levels and between one level and the other.

In practice it has been found that the described invention achieves the intended aim and objects.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to the requirements without thereby abandoning the scope of the protection of the claims that follow.

The disclosures in Italian Patent Application no. GE2004A000073, from which this application claims priority, are incorporated herein by reference.

The invention claimed is:

1. A harbor structure defining a length direction and a width direction perpendicular to the length direction, the harbor structure comprising:
    an underpinning system configured to rest on a sea floor, said underpinning system defining a laying level having a lower surface configured to interface with the sea floor and an upper surface;
    a lower level positioned above said laying level, said lower level comprising a deck, said deck positioned at said upper surface of said laying level;
    an upper level positioned above said lower level;
    a storage area defined in said lower level between said deck and said upper level, said storage area configured to receive and store at least one container and allow for selective movement of said at least one container within said storage area;
    at least one first device positioned within said storage area for selectively moving said at least one container within said storage area, said at least one first device configured to selectively move said at least one container in said length direction and in said width direction within said storage area; and
    at least one second device positioned at said upper level for selectively moving said at least one container on said upper level, said at least one second device configured to selectively move said at least one container in said length direction and said width direction.

2. The harbor structure according to claim 1, further comprising a support structure, said support structure including at least one pillar extending from the deck and engaging said upper level.

3. The harbor structure according to claim 2, wherein the support structure comprises at least two pillars, and the at least two pillars are spaced to allow said storing and said selective movement of said at least one container within said storage area.

4. The harbor structure according to claim 1, wherein said at least one first device comprises at least one bridge crane.

5. The harbor structure according to claim 4, wherein said at least one bridge crane comprises at least one low height crane.

6. The harbor structure according to claim 5, where said at least one low height crane is positioned below said upper level at the top of said lower level.

7. The harbor structure according to claim 1, wherein the at least one first device is further configured to selectively move said at least one container in a vertical direction.

8. The harbor structure according to claim 7, wherein the at least one second device is further configured to selectively move the at least one container in a vertical direction.

9. The harbor structure according to claim 8, wherein said upper level further comprises at least one opening and the at least one second device is configured to selectively move said at least one container in a vertical direction between said upper level and said storage area through said at least one opening.

* * * * *

UNITED STATES PATENT AND TRADEMARK OFFICE
CERTIFICATE OF CORRECTION

| | | |
|---|---|---|
| PATENT NO. | : 8,376,658 B2 | Page 1 of 1 |
| APPLICATION NO. | : 11/658252 | |
| DATED | : December 11, 2001 | |
| INVENTOR(S) | : Zanovello et al. | |

It is certified that error appears in the above-identified patent and that said Letters Patent is hereby corrected as shown below:

Title page, Item (73) Assignee: Delete "Reggiane Cranes and Plants S.p.A." and replace With -- Gottwald Port Technology GmbH --.

Signed and Sealed this
Twenty-eighth Day of May, 2013

Teresa Stanek Rea
*Acting Director of the United States Patent and Trademark Office*